Patented Jan. 16, 1951

2,538,092

UNITED STATES PATENT OFFICE 2,538,092

WATER-SOLUBLE SULFAQUINOXALINE TABLET

Walter C. Gakenheimer, Westfield, N. J., assignor to Merck & Co., Inc., Rahway, N. J., a corporation of New Jersey No Drawing. Application March 4, 1949, Serial No. 79,715

8 Claims. (Cl. 167—53.2)

This invention relates to the preparation of medicinal tablets and, more specifically, to sulfaquinoxaline tablets which disintegrate and dissolve readily in water and to a method for the preparation of said tablets.

Cecal or bloody coccidiosis, a disease of young chicks caused by the microscopic parasite, *Eimeria tenella*, is responsible for the loss of about 10% of all chicks hatched in the United States. The parasite is quite resistant to disinfectants so that it is difficult, if not impossible, to eliminate it and thus prevent exposure even when good sanitation practices are followed. With the availability of the sulfonamides and, specifically, sulfaquinoxaline (2-sulfanilamidoquinoxaline), effective results in controlling the parasite have been obtained, thereby minimizing to a considerable extent the death losses in a flock. Results indicate that the preventative use of sulfaquinoxaline has been effective in reducing the mortality due to coccidiosis to an average of 1-2%.

It has been found that when sulfaquinoxaline is incorporated in the feed at concentrations varying from 0.005-0.1%, outbreaks of cecal coccidiosis can be effectively curtailed. The administration of about 0.05% sulfaquinoxaline medicated feed will check and reduce mortality in acute fowl cholera, a bacterial disease of poultry caused by *Pasteurella multocida*.

The conventional procedure for the preparation of sulfaquinoxaline medicated feeds is somewhat involved and time-consuming, the chief difficulty being due to the mixing of the drug with the feed to supply medication for large flocks of poultry. Since the sulfaquinoxaline is so active, the ingestion of excessive amounts of this drug is sufficient to cause toxic reactions such as decreased appetite, retarded growth, or other more serious consequences. Similarly, if the concentration of the sulfaquinoxaline is too low, the drug will be of no value in either preventing or minimizing the effects of these poultry diseases. Therefore, it is absolutely essential that the drug be thoroughly and evenly mixed in the feed in the prescribed concentrations.

The preparation of sulfaquinoxaline solutions of predetermined composition for use in preparing medicated feeds or, alternatively, for use as medicated drinking water for poultry has also presented a problem. Sulfaquinoxaline itself is a relatively insoluble material and, hence, unsuitable for use as such. Alkali metal salts of sulfaquinoxaline, as for example the sodium salt, are readily soluble in water but in the normally available amorphous form, these salts are deliquescent and, therefore, difficult to handle. Attempts to prepare tablets using the amorphous sodium sulfaquinoxaline for use in preparing medicinal solutions of predetermined concentration have heretofore proved impracticable and, while a crystalline form of sodium sulfaquinoxaline is available which is not deliquescent, the preparation of this crystalline material involves additional manufacturing steps materially increasing the cost of the crystalline material, thus making its use in the preparation of medicinal tablets uneconomical and impractical.

It has now been discovered, in accordance with the present invention, that an improved sulfaquinoxaline tablet can be economically prepared directly from the sulfaquinoxaline which will disintegrate and dissolve rapidly when placed in water. The new tablet, is accordance with the present invention, comprises a heterogeneous mixture of two types of granules and a finely divided solid lubricant interspersed between said granules, the granules of one type consisting of a reacted mixture of sulfaquinoxaline and an alkali metal carbonate and the granules of the second type consisting of an alkali metal sulfocarbolate. The amount of the alkali metal sulfocarbolate should be greater than ½ the total weight of all of the tablet ingredients and preferably about 55-65% of said total weight. About 35-40% of the tablet weight is made up of granules of the reacted sulfaquinoxaline-alkali metal carbonate mixture, the sulfaquinoxaline and alkali metal carbonate preferably being combined in the ratio of about 1-4 by weight. The solid lubricant is required in relatively small amounts, about 6-8% based on total weight of the tablet components being sufficient to facilitate tableting of the mixture.

In preparing tablets having the composition above described, the sulfaquinoxaline and alkali metal carbonate are thoroughly mixed in a dry state, then moistened with water and granulated by passing the moist mixture through a sieve of predetermined size, preferably about 10 mesh. The granules thus formed are dried preferably by heating first at about 40° C. and then for an additional time at about 80° C. In forming the granules the addition of water to the mixture of sulfaquinoxaline and sodium carbonate causes interreaction therebetween, the sulfaquinoxaline being completely converted to sodium sulfaquinoxaline. It will be evident, however, that the amount of sodium carbonate employed is considerably in excess of that required to form the sodium sulfaquinoxaline and it is found that in the resulting granules, the solium sulfaquinoxaline, in conjunction with the excess sodium carbonate, exhibits none of the objectionable deliquescent properties characteristic of free amorphous sodium sulfaquinoxaline.

The alkali metal sulfocarbolate is separately moistened and granulated by passing through a screen, preferably of the same size employed in making the sulfaquinoxaline granules, and these granules are, in turn, dried by heating first at about 40° C. and finally at about 85°–140° C.

The two type granules thus prepared are then thoroughly mixed with the dried lubricant, such as, for example a finely divided mixture of about 12 parts of boric acid to one part of sodium lauryl sulfate, and the mixture is ready for tableting.

Tablets prepared from this mixture disintegrate within 30 seconds when dropped into water and are thoroughly dissolved within about 45 seconds with stirring. Even without stirring complete dissolution is effected in about 5 minutes. In contrast to this, tablets made up with the same ingredients but by compression of a single granulation containing the alkali metal sulfocarbolate, together with the sulfaquinoxaline and alkali metal carbonate, do not completely dissolve even after standing in water for 30 minutes. It is not known why the disintegrating action of the separate granules of the alkali metal sulfocarbolate is lost when the sulfocarbolate is granulated in intimate contact with the other components. It will be apparent, however, that it is essential, in order to achieve the desired results, that the two type granules be individually prepared and dried so that the distinct character of the two type granules is retained in the finished tablet.

The use of an alkali metal sulfocarbolate as a disintegrating agent in the improved tablet appears to be a critical factor. Other known water-soluble disintegrating agents such as sodium sulfate, disodium phosphate, trisodium phosphate, potassium citrate, sodium xylene sulfonate and sodium toluene sulfonate have been tried and found to be incapable of disintegrating the sulfaquinoxaline tablets. The effervescent type of disintegrating agent, such as a mixture of citric acid and sodium bicarbonate, cannot be employed in the sulfaquinoxaline tablets since dissolution of a tablet containing such a disintegrating agent would form a solution having a pH low enough to cause precipitation of sulfaquinoxaline. Corn starch, another material often used to aid in disintegration of tablets, is unsuited in this instance, since it produces an objectionable cloudy solution.

The excess of alkali metal carbonate employed in the tablet serves to keep solutions, made by dissolving the tablets, at an alkaline pH, thus preventing the possibility of precipitation of sulfaquinoxaline.

When sulfaquinoxaline tablets are to be used in excessively hard water, it may be advisable to incorporate in the tablets about 0.5–2.0% by weight of a water softener such as sodium hexametaphosphate. The water softener, if employed, should be mixed with the two type granules, together with the solid lubricant.

The following examples show how the new sulfaquinoxaline tablets of the present invention can be prepared but it is to be understood that these examples are given by way of illustration and not of limitation.

Example I

Tablets of sulfaquinoxaline containing the following ingredients were prepared as follows:

|  | Per Tablet | Per 1,000 Tablets |
|---|---|---|
|  | Grams | Grams |
| Sulfaquinoxaline | 0.1250 | 125.0 |
| Sodium carbonate, monohydrated | 0.5800 | 580.0 |
| Sodium sulfocarbolate (20–60 mesh) | 1.0950 | 1,095.0 |
| Boric acid, dried at 80° C | 0.1250 | 125.0 |
| Sodium lauryl sulfate | 0.0100 | 10.0 |
|  | 1.9350 | 1,935.0 |

Using quantities required for 1000 tablets, the sulfaquinoxaline and the sodium carbonate were thoroughly mixed and sifted through a 40 mesh stainless steel sieve. The powder was then thoroughly moistened with approximately 50 cc. of water and the dampened mass was forced through a 10 mesh stainless steel sieve. The moist granules were dried at 40° C. for 4 hours and then at 80° C. for 4 additional hours. The dried granules were then cooled to room temperature and pressed through a 20 mesh stainless steel sieve.

The sodium sulfocarbolate (commercial crystalline material of 20–60 mesh size) was moistened with approximately 100 cc. of water and the dampened mass was forced through a 10 mesh stainless steel sieve. The moist granules were dried at 40° C. for 4 hours and then at 140° C. (may be lowered to 85° C.) for 4 additional hours. The dried granules were then cooled to room temperature and pressed through a 20 mesh stainless steel sieve.

The separate granule masses were mixed by tumbling. The boric acid and the sodium lauryl sulfate were triturated together and sifted through a 100 mesh stainless steel sieve onto the granule mixture. After thorough mixing by tumbling, the lubricated granules were compressed into tablets weighing 1.935 g. each. The granules compressed very well, no sticking or binding occurring.

When placed in one gallon of water, a tablet produced by this method disintegrated in 25 seconds and dissolved completely within 45 seconds when accompanied by stirring. The period required for complete dissolution without stirring was less than 5 minutes. The solution pH was 9.

Solutions containing 1 to 8 of the tablets in one gallon of water exposed to the atmosphere were still clear after standing for a period of one week. On examination, it was found that the original activity of the sulfaquinoxaline had not abated.

A number of tablets were bottled and shipped from New Jersey to California and then returned to New Jersey and inspection revealed that none of the tablets had been measurably broken or chipped and only a negligible quantity of powder was found at the bottom of the bottles.

Example II

A batch of 1000 tablets was prepared using the various ingredients and corresponding quantities as specified in Example I but employing a different procedure of mixing.

The sulfaquinoxaline, the sodium carbonate and the sodium sulfocarbolate were thoroughly mixed and sifted through a 20 mesh stainless steel sieve. The powder was then thoroughly moistened with approximately 150 cc. of water and the dampened mass was forced through a 10 mesh stainless steel sieve. The moist granules were dried at 40° C. for 4 hours and then at 140° C. overnight. After cooling to room temperature the dried granules were pressed through a 20 mesh stainless steel sieve.

The boric acid and the sodium lauryl sulfate were triturated together and sifted through a 100 mesh stainless steel sieve onto the granules. After thorough mixing by tumbling the lubricated granules were compressed into tablets weighing 1.935 g. each.

Immersion tests were conducted on several tablets by adding a tablet to one gallon of water and then noting the results. None of the tablets disintegrated and all of the tablets dissolved very slowly, requiring in each case a period of time in excess of 30 minutes for complete dissolution.

It will, of course, be apparent that the particular size of tablet to be made will depend upon the intended use of the tablet. A tablet made as described in Example I, when dissolved in a gallon of water, gives a solution containing about 0.0033% of sulfaquinoxaline.

Likewise, it is to be understood that the term tablet as used throughout the specification and claims is intended to mean any compressed or molded mass having a convenient shape for distribution and use. Thus, the tablets may be made in the form of flat discs or pellets, rounded bodies or balls, or even in the form of bodies specially shaped to characterize the product.

Various changes and modifications may be made in carrying out the present invention without departing from the spirit and scope thereof. Insofar as these changes and modifications are within the scope of the appended claims, they are to be considered as part of this invention.

I claim:

1. A method for the preparation of disintegrable, water-soluble sulfaquinoxaline tablets which comprises granulating a damp mixture of sulfaquinoxaline and an excess of an alkali metal carbonate, drying the granules thus produced, separately granulating a moistened mass of an alkali metal sulfocarbolate and drying the resulting granules, mixing together the granules thus prepared and a finely divided solid lubricant and compressing the mixture into tablets.

2. A method for the preparation of disintegrable, water-soluble sulfaquinoxaline tablets which comprises granulating a damp mixture of sulfaquinoxaline and excess sodium carbonate, drying the granules thus produced, separately granulating a moistened mass of sodium sulfocarbolate and drying the resulting granules, mixing together the granules thus prepared and a finely divided solid lubricant, and compressing the mixture into tablets.

3. A method for the preparation of disintegrable, water-soluble sulfaquinoxaline tablets which comprises granulating a damp mixture of about 1–4 sulfaquinoxaline-sodium carbonate, drying the granules thus produced, separately granulating a moistened mass of sodium sulfocarbolate and drying the resulting granules, mixing together 35–40 parts of said first-named granules, 55–65 parts of said second-named granules and about 6–8 parts of a finely divided solid lubricant, and compressing the mixture into tablets.

4. The method as described in claim 3 wherein the lubricant used is about a 12–1 mixture of boric acid and sodium lauryl sulfate.

5. A disintegrable, water-soluble sulfaquinoxaline tablet comprising a heterogeneous mixture of two types of granules of substantially uniform size and a finely divided solid lubricant interspersed between said granules, the granules of one type consisting of a reacted mixture of sulfaquinoxaline and an excess of an alkali metal carbonate and the granules of the second type consisting of an alkali metal sulfocarbolate.

6. A disintegrable, water-soluble sulfaquinoxaline tablet comprising a heterogeneous mixture of two types of granules of substantially uniform size and a finely divided solid lubricant interspersed between said granules, the granules of one type consisting of a reacted mixture of sulfaquinoxaline and excess sodium carbonate and the granules of the second type consisting of sodium sulfocarbolate.

7. A disintegrable water-soluble sulfaquinoxaline tablet comprising a heterogeneous mixture of two types of granules of substantially uniform size and a finely divided solid lubricant interspersed between said granules, the composition of said tablet being approximately 35–40% by weight of granules of about a 1–4 reacted mixture of sulfaquinoxaline and an alkali metal carbonate, 55–65% by weight of granules of an alkali metal sulfocarbolate and about 6–8% by weight of solid lubricant.

8. A disintegrable water-soluble sulfaquinoxaline tablet comprising a heterogeneous mixture of two types of granules of substantially uniform size and a finely divided solid lubricant interspersed between said granules, the composition of said tablet being approximately 35–40% by weight of granules of about a 1–4 reacted mixture of sulfaquinoxaline and sodium carbonate, 55–65% by weight of granules of sodium sulfocarbolate and about 6–8% by weight of solid lubricant, consisting of about a 12–1 mixture of boric acid and sodium lauryl sulfate.

WALTER C. GAKENHEIMER.

REFERENCES CITED

The following references are of record in the file of this patent:

UNITED STATES PATENTS

| Number | Name | Date |
| --- | --- | --- |
| 1,486,373 | Gerngross | Mar. 11, 1924 |
| 2,195,596 | Nitardy | Apr. 2, 1940 |
| 2,293,359 | Quisling | Aug. 18, 1942 |
| 2,404,199 | Weijlard | July 16, 1946 |
| 2,449,080 | Mayfield | Sept. 14, 1948 |

OTHER REFERENCES

Science, vol. 107, page 196, Feb. 20, 1948.